(12) United States Patent
Buscemi

(10) Patent No.: US 11,936,648 B2
(45) Date of Patent: *Mar. 19, 2024

(54) METHODS AND APPARATUS FOR ALLOWING USERS TO CONTROL USE AND/OR SHARING OF IMAGES AND/OR BIOMETRIC DATA

(71) Applicant: Cecelumen, LLC, Camarillo, CA (US)

(72) Inventor: James S Buscemi, Camarillo, CA (US)

(73) Assignee: Cecelumen, LLC, Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/396,751

(22) Filed: Aug. 8, 2021

(65) Prior Publication Data

US 2022/0109670 A1 Apr. 7, 2022

Related U.S. Application Data

(63) Continuation of application No. 16/162,159, filed on Oct. 16, 2018, now Pat. No. 11,089,014, which is a continuation of application No. 15/084,883, filed on Mar. 30, 2016, now Pat. No. 10,129,253.

(60) Provisional application No. 62/274,972, filed on Jan. 5, 2016, provisional application No. 62/185,489, filed on Jun. 26, 2015.

(51) Int. Cl.
*H04L 29/06* (2006.01)
*H04L 9/40* (2022.01)

(52) U.S. Cl.
CPC .......... *H04L 63/0861* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 9,396,354 B1* | 7/2016 | Murphy | H04L 51/212 |
| 2011/0202968 A1* | 8/2011 | Nurmi | G06F 21/10 726/1 |
| 2012/0011085 A1* | 1/2012 | Kocks | G06N 5/02 706/12 |
| 2012/0241227 A1* | 9/2012 | Rogers | G01G 19/44 177/1 |
| 2014/0287723 A1* | 9/2014 | LaFever | G06Q 30/0255 455/411 |

(Continued)

*Primary Examiner* — Fatoumata Traore
(74) *Attorney, Agent, or Firm* — Straub & Straub; Michael P. Straub; Stephen T. Straub

(57) ABSTRACT

Methods and apparatus for allowing an individual to preserve his/her privacy and control the use of the individual's images and/or personal information by other, without disclosing the identity of the individual to others, are described. In various embodiments the individual seeking privacy provides his/her identifying information, images, and sharing preferences indicating desired level of privacy to a control device which is then stored in a customer record. The control device can be queried to determine if an image or other information corresponds to a user who has restricted use of his/her image or other information in a public manner. Upon receiving a query the control device determines using the stored customer record whether an individual has authorized use of his or her image. Based upon the determination a response is sent to the querying device indicating whether the use of the image and/or individual's information is authorized.

20 Claims, 6 Drawing Sheets

(56) References Cited

U.S. PATENT DOCUMENTS

2014/0337930 A1* 11/2014 Hoyos .................. H04L 63/10
  726/4
2015/0026078 A1* 1/2015 Weich ................ H04L 63/0807
  705/310

* cited by examiner

METHODS AND APPARATUS FOR ALLOWING USERS TO CONTROL USE AND/OR SHARING OF IMAGES AND/OR BIOMETRIC DATA

RELATED APPLICATIONS

The present application is a continuation of U.S. patent application Ser. No. 16/162,159 which was filed on Oct. 16, 2018 and published as US 2019-0052633 A1 on Feb. 14, 2019, which is a continuation of U.S. patent application Ser. No. 15/084,883 which was filed on Mar. 30, 2016 and published as US 2016-0381013 A1 on Dec. 29, 2016 and which issued as U.S. Pat. No. 10,129,253 on Nov. 13, 2018, which claims the benefit of U.S. Provisional Patent Application Ser. No. 62/274,972 which was filed on Jan. 5, 2016 and U.S. Provisional Patent Application Ser. No. 62/185,489 which was filed on Jun. 26, 2015, each of which is hereby expressly incorporated by reference in its entirety.

FIELD

Various embodiments relate to privacy and/or security improvement methods and apparatus, and more particularly to methods and apparatus that support preserving an individual's privacy and providing control to the individual over the use of the individual's images that include facial biometric data and/or control to the individual of use of other biometric modalities, e.g., Fingerprint Recognition, Iris Recognition, Retina Recognition, Gait/Body Recognition, Facial Thermography etc.

BACKGROUND

The collection of images and other biometric data of individuals, including children, is common place. In many cases images or other biometric data of individuals may be captured without the individual's knowledge or authorization. The captured images may subsequently be displayed to public, such as on Facebook pages of friends and/or on other Internet sites, often without the consent of the individual whose picture is being displayed. For example, a child, under parental guidance, may have intentionally avoided posting any personal images on the Internet but may be captured in a photo taken at a party by a friend or other individual who then displays the captured image.

Other cases where images may be captured and used without an individual's knowledge include reality TV and/or promotion videos. For example, stores or restaurants may capture images of an individual on camera without the individual's knowledge and then use the images for a variety of purposes. The use of images captured at a restaurant for promotional or other reasons may result in an individual's image, without the individual's consent, being displayed or publicly used in advertising material.

Unfortunately, while individuals may control what images they post to web sites or authorize to be used for various purposes, they often have little control over what images other people post. Furthermore websites which allow people to post images which may include pictures from parties, etc. currently lack practical ways of policing the display and/or use of images of individuals who would prefer not to have pictures of themselves shown in public for security, privacy or other reasons.

While well known and/or wealthy individuals may desire to avoid having images of their children shown on the Internet for security reasons relating to potential kidnapping and ransom concerns, many individuals feel they have a right to control the use of their image out of privacy concerns and/or for other reasons. Web sites and other content users may desire to avoid the unauthorized use of images of individuals because of legal concerns or out of a respect for an individual's privacy.

Given privacy and legal concerns, companies in many cases would prefer to avoid the unauthorized use of video and/or images of private individuals for commercial purposes. In addition, some social sites may seek to show respect for an individual's privacy and may not want to display an individual's image, particularly images of individual children, without the consent of the individual or the individual's guardian.

While Facial Recognition Technology (FRT) as well as other biometric recognition techniques have made many advancements and continue to improve at a rapid rate, such techniques are also starting to be utilized by big box stores and analytic companies in a way that is invading people's privacy. Thus, while technical advancements in the capture and/or use of biometric data has the potential to provide many benefits, lack of control over use and/or distribution of such information poses serious consumer privacy challenges.

In view of the above, it should be appreciated that there is a need for methods and/or apparatus which would allow individuals to indicate a desire to maintain their privacy and restrict the use of images and/or biometric data in a public way, such as the display of images of the individual on a website, and allow for others to be made aware of the individual's desire for privacy, without divulging details or the identity of the individual to a person or entity seeking to use an image of the individual.

SUMMARY

Methods and apparatus for allowing an individual to indicate to others his/her preference for privacy with regard to use of images and/or other biometric data corresponding to the individual, without the disclosure of the identity of the individual to others, are described. In various embodiments the individual seeking privacy provides identifying biometric information which is stored on a secure server and indicates the desired level of privacy. The biometric information may include images of the individual seeking privacy and/or information defining user features such as eye spacing, eye color, height, and/or information indicating one or more facial recognition characteristics or measurable physical characteristics including facial characteristics, face geometry, finger prints, retina patterns for retinal scan recognition, iris recognition patterns and/or other recognizable/measurable features, which may be used to identify the individual. The individual may indicate a desire to ban all use of his/her information and/or images, specify particular services that may use his/her information and/or images, limits on use of his/her information and/or images, and/or allow unrestricted use of his/her information and/or images. For example, a user may indicate that use of images of the individual for non-commercial purposes is permitted and/or use of the individual's image on particular web sites, e.g., a dating web site, is permitted. The information corresponding to an individual is stored in a customer record, which is maintained in a secure manner, along with information which can be used to detect images of the individual and/or other biometric data identifying the individual. Multiple individual customer records are stored and used for purposes of responding to queries. The identifying information may be, and sometimes is, encrypted.

A privacy control node, also sometimes referred to as a registration and biometric information management entity, which stores the customer records and/or which has access to the securely stored customer record information can be queried to determine if information, e.g., an image, facial recognition data and/or biometric information corresponds to a user and additional if the corresponding user has restricted use of his/her information, e.g., image, or user's other biometric information in a public manner or for some particular use.

A query to the privacy control node, e.g., server, in some embodiments, provides a copy of the image or other information the querying party is seeking to use for some particular purpose. The querying party may or may not know the identity of the individual or individuals to which the image or information correspond. For example, a query may include a photo, with one or more people shown, may indicate the intended use of the photo and/or the website or service with which the photo is to be used. The query may also identify one or more individuals known to be in the photo but may not identify any individual if the identity of the individuals is not known. The privacy control server identifies individual(s) to which the information in the query corresponds. For example, the privacy control server may use image recognition and information in the secure database to identify individuals in a photo submitted as part of resolving a query. For each identified individual, the privacy server then checks the corresponding customer record and information sharing preferences and returns a reply based on the customer record information.

The privacy control server specifies for each identified individual by the privacy server with respect to a query, whether the intended use indicated in the query is authorized or not. The identity of the identified individual need not be returned as part of the query response and is not returned in some embodiments. Thus, in at least some embodiments the identity of an individual or individuals in a photo need not, and in various embodiments are not, disclosed to the party submitting the query to the server. In this way an individual can specify his/her desire to have the use of the individual's image restricted without providing identifying information to the party seeking to use an image, e.g., photo.

In other embodiments, if the identified individual has authorized the use of his/her image or other information and the disclosure of his/her name for the use indicated in the query, the identity of the user may be, and sometimes is, returned with the query response.

When multiple individuals are shown in an image, the query response may and sometimes does include a copy of the image submitted as part of the query but with the images of the individuals who indicated a desire that their image not be used blocked out, blurred or otherwise indicated as being subject to a privacy request.

Thus, in response to a query, a party submitting the query can determine which individual or individuals shown in an image has indicated a desire for their image not to be used in the manner intended by the party submitting the query. In some embodiments the security server returns a modified photo with the distinguishing features of the individual or individuals being blurred or replaced with another image, e.g., a stock image of a face of a person who has authorized use of his/her image. In other embodiments the device or system submitting the query receives the response and performs the image modification prior to using the photo or other image which was submitted as part of the query.

Various image comparison and/or user identification techniques may be used to compare input images to the stored images and/or identifying biometric information stored and/or accessed by the security server. Accordingly, the methods and apparatus can be used for checking photos as well as other biometric identification information that may be captured in a passive manner including infrared scans and/or other types of information collected from individuals, e.g., in a passive manner.

The security server may be part of an opt out service which is intended to allow individuals to opt out and/or otherwise control the use of their images on the Internet and/or in other public forums. Different web sites, reality TV producers and/or individual companies trying to make promotional videos may query the security server and receive responses allowing the querying party to determine if they are allowed to use the photos and/or images of individuals even if there identity is not known. While individuals provide identifying information to the provider of the security service, there privacy is protected by denying the querying party access to the underlying images or other identifying information used by the security sever to determine the identity of the party in an image.

The methods and apparatus are particularly well suited for use with Internet services where the Internet service may receive a large number of group photos, may desire to respect individuals privacy when an individual has expressly indicated a desire not to have his/her image displayed without authorization, but may not have access to information which can be used to identify individuals or lacks knowledge of the individual's preferences with regard to the use of his/her images.

In addition to providing a response to a query, in some embodiments a user may be provided with a report on queries regarding images in which the user's likeness was detected. The report may, and in some embodiments does, include information on the number of images in which the user's likeness was detected, the date the image was submitted for review and/or the date of the image which in many cases is embedded into the image file that was submitted for review. The identity of the party submitting the query maybe and in some embodiments is omitted from the report regarding queries provided to the user. In other embodiments the identity of the party or service submitting the query including the user's image is included in the report provided to the user. In this way not only is the user provided the opportunity to indicate his/her preference to not have his/her images used for particular purposes the user maybe made aware of others taking photos of the user without his/her knowledge and providing the user of the privacy service to increase the precautions taken to decrease the chance of others taking images without the individual's knowledge in the future.

In view of the above, it should be appreciated the methods and apparatus described herein address the technical problem of communicating a user's privacy desires with regard to image use or use of other biometric data while shielding the user from having to disclose his/her identity. Furthermore, the methods and apparatus described herein can be used without a querying party having to know the identity of individual(s) in an image and can be used to review content submitted by someone seeking to post or display an image in a public manner on the querying party's web site potentially without the authorization of one or more individuals in image submitted for display.

An exemplary method of operating a privacy server in accordance with an exemplary embodiment comprises:

receiving a query including an image of one or more individuals; identify an individual in the image; and determining from stored information whether the identified individual has authorized use of his or her image.

While many embodiments and features have been discussed in the above summary, it should be appreciated that many of the novel features described herein can be used independent of other novel features. Thus while various exemplary embodiments have been described, the application is not limited to the particular exemplary embodiments or combinations of features described in particular exemplary embodiments. Numerous additional features and embodiments are described in the detailed description which follows

DETAILED DESCRIPTION

Figure 1:
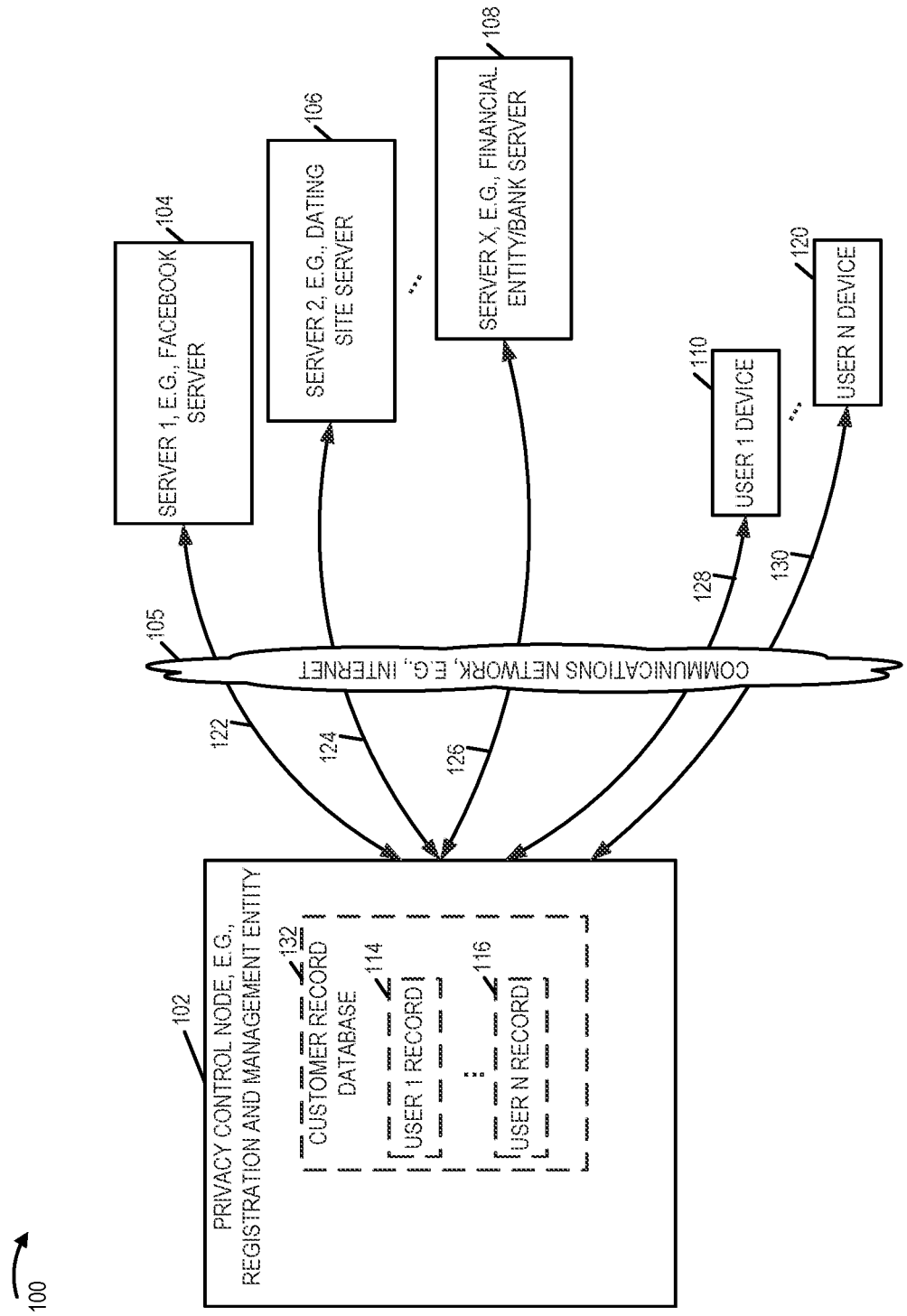
FIG. 1 illustrates an exemplary system implemented in accordance with the present invention.

FIG. 1 illustrates an exemplary system 100 implemented in accordance with an exemplary embodiment. Exemplary system 100 supports creating customer records based on customer provided sharing preference information and use of such information to verify/determine whether one or more customers have permitted the use of their images and/or other information, e.g., by networks, service providers and/or other entities.

Exemplary system 100 includes a privacy control node 102, a plurality of servers/devices 104, 106, . . . , 108 corresponding to service providers, social and/or non-social networks etc., and a plurality of user devices 110, . . . , 120. The privacy control node 102 (also referred to as the registration and biometric information management entity) operates as an independent control node that assists various network servers and devices 104, 106, . . . , 108 in determining whether an individual has authorized use of his or her images and/or other personal information. The plurality of servers/devices corresponding to service providers, social and/or non-social networks in the system include a server 1 104 corresponding to a social network, e.g., such as Facebook, a server 2 106 corresponding to a dating site, e.g., such as match.com or such and a server X 108 corresponding to a financial institution/entity such as a bank. The user equipment devices (UEs) (also referred to as user device) in the system 100 include user 1 device 110 through user N device 120 which correspond to various individuals/users. A user device may be a Smartphone, laptop, PC, a tablet device, Smart TV or another communications device via which a user can communicate information with other devices in the system.

The privacy control node 102 in some embodiments includes, e.g., stores in a memory, a customer record database 132 including customer records corresponding to a plurality of individuals/users including user 1 record 114, . . . , and user N record 116. Each of the customer records 114 through 116 includes customer information corresponding to the individual/customer to which the record corresponds including, e.g., biometric samples and/or extracted templates, use and/or sharing preference information set by the users or another handler, e.g., entity representing the user. The customer sharing preference information indicates user restrictions and/or authorized uses of images, facial recognition templates and/or other biometric information of the individual, authorized services, entities and/or authorized web sites for which the individual has indicated his/her images and/or information may be used. Thus the sharing preference information for an individual stored in the customer record indicates whether the individual has authorized use of his or her image and/or other information for one or more purposes/uses and/or identifies authorized services, entities, websites, networks etc., for which the individual has indicated his/her image and/or information may be used, e.g., for sharing on a public or private platform, for performing identity verifications and/or for other uses in accordance with the features of the invention. In some other embodiments the customer record database 132 including customer records may not be stored within the privacy control node 102 but rather externally at a secure site, with the privacy control server 102 being able to securely access, manage and/or maintain the customer record database 132 including the customer records. The information and/or signaling can be communicated from the privacy control node 102 over the communications network 105 via a privacy control node network interface which couples the privacy control node 102, via the links 122, 124, 126 to the plurality of servers/devices. The customer record database 132 and the information stored therein are discussed in greater detail later.

In accordance with one feature of some embodiments when a service provider server, networking site server and/or other entity (e.g., such as servers 104, 106, 108) intends to use an image and/or other information corresponding to an individual, the server sends a query including biometric information which can be used to identify one or more individuals to the privacy control server 102 requesting assistance in determining if an individual in the image and/or individual to whom the biometric information corresponds has authorized use of his or her information. In some embodiments a query may include biometric information and/or extracted feature sets which the requesting party is sending for testing to determine if they match a user's stored biometric information. In various embodiments the querying device/server sends the query prior to using the image and/or information corresponding to the individual, e.g., prior to publishing/posting one or more images and/or profile information corresponding to the user of interest on a website. In some embodiments upon receiving the query from a querying device/server the privacy control server 102 identifies an individual based on the received biometric information for whom sharing authorization information is sought, determines, using the stored information in the customer database 132 corresponding to the identified individual whether the identified individual has authorized use of information corresponding to the identified individual or an image of the identified individual, and responds to the querying device/server with information indicating whether the use has been authorized or not.

Figure 2:
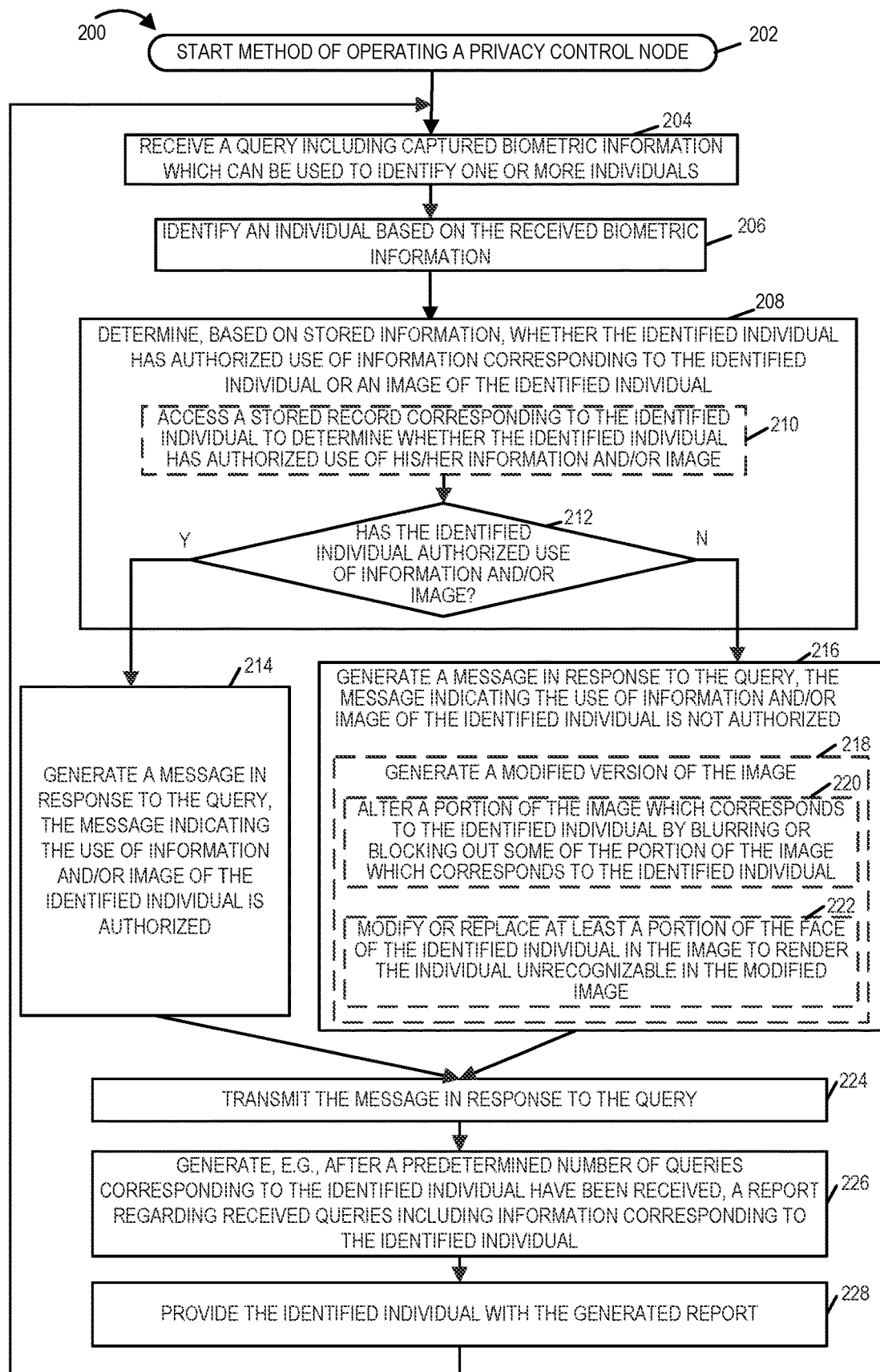
FIG. 2 is a flowchart illustrating the steps of an exemplary method of operating an exemplary privacy control server in accordance with an exemplary embodiment of the invention.

FIG. 2 is a flowchart illustrating the steps of an exemplary method of operating an exemplary privacy control device, e.g., privacy control server 102, in accordance with an exemplary embodiment of the invention. The exemplary method starts in step 202 with the privacy control device being powered on. Operation proceeds from start step 202 to step 204. In step 202 the privacy control device receives a query including captured biometric information, e.g., biometric samples, which can be used to identify and/or match the identity of one or more individuals. In some embodiments the biometric information includes an image of the identified individual. In some embodiments the biometric information include weight or a fingerprint scan of the user. While actual biometric information may be included in queries sometimes, in some embodiments queries include biometric templates, e.g., digital numerical data extracted from captured raw biometric samples using signal processing and computation. The query may be received from a device and/or server that intends to use information, e.g., images or other data, of an individual to whom the information included in the query corresponds. The use of information and/or images may include, e.g., publishing/posting of the information and/or images corresponding to the individual on a social networking site, dating site, professional networking site and/or using the images for other commercial or non-commercial purposes, use of biometric data such as signatures and/or fingerprints for verification of financial transactions and/or access to objects or sites. The use of the information and/or images of the individual may also include the use of images by an adult site server. For example Facebook server 104 may send an inquiry including an image of an individual to the privacy control server 102 requesting sharing preference of the individual in the image prior to allowing the image and/or one or more other images of the individual to be posted on the Facebook webpage.

Operation proceeds from step 204 to step 206. In step 206 the privacy control server 102 identifies an individual based on the received biometric information and/or template with the query. In some embodiments when the biometric information in query is an image with a plurality of individuals in the image, the device sending the query also provides information indicating an individual of interest in the image, among the plurality of individuals in the image, for which sharing preference and/or other information is sought. In various embodiments the privacy control server 102 performs the identification of the individual using the receiver biometric information to recognize/identify the individual. The identification in some embodiments includes determining and extracting the facial characteristics/features and/or recognition data corresponding to the individual from the image. In some embodiments when multiple individuals are included in the image provided as part of the query, the privacy control server identifies each of the individuals to which the information in the query corresponds. For example, the privacy control server may first use image recognition and/or other techniques for identifying the individuals in a similar manner as discussed above and then search the customer record database 132 for matching individuals. As should be appreciated, identification of the individual is needed in order for the privacy control server 102 to perform further processing (e.g., locate corresponding individual's customer record and check corresponding sharing preference and/or other information) and respond to the query.

Figure 4:
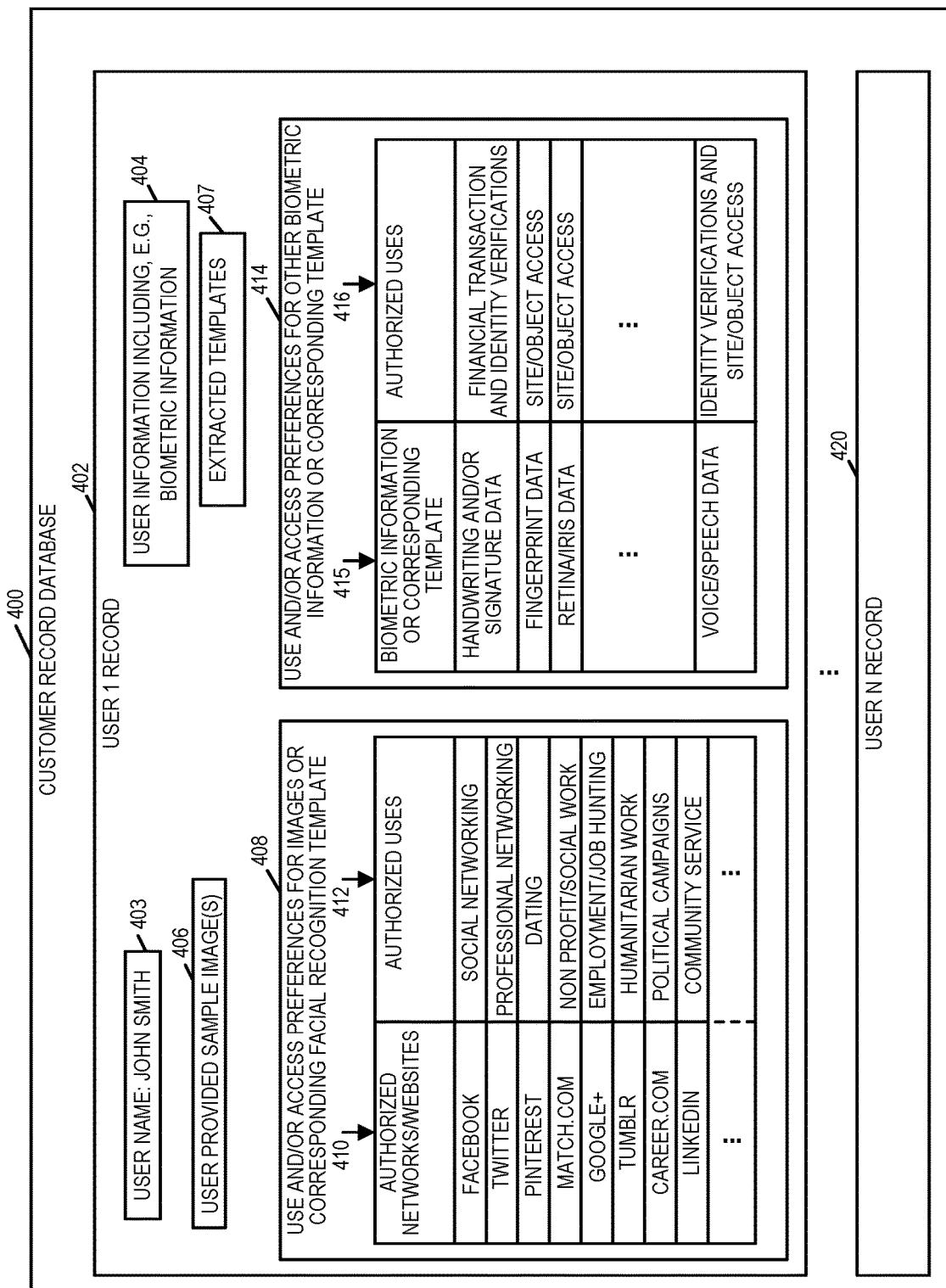
FIG. 4 illustrates an exemplary customer record database including exemplary customer records corresponding to different users in accordance with one exemplary embodiment.

In various embodiments the privacy control server 102 stores and/or has access to a customer database record 122 including information regarding sharing preference and/or image use authorization information corresponding to a plurality of customers. Such an exemplary customer database with customer records corresponding to one or more customers is illustrated in FIG. 4 and discussed below. In some embodiments after identifying the individual the privacy control server 102 checks, e.g., performs a lookup, of the customer record database 122 to check if a record corresponding to the individual exists in the database. In some embodiments the privacy control server 102 compares the identification information corresponding to the individual identified in step 206 to identification information corresponding to various customers in the database 122 to find if there is a match. The identification information in the customer record corresponding to an individual may include, one or more sample images, biometric information including images and/or facial recognition data, voice sample, handwriting and/or signature sample, fingerprint sample, retina and/or iris scan sample and/or other feature/characteristic data indicative of biometric modalities corresponding to an individual.

Operation proceeds from step 206 to step 208. In step 208 the privacy control server 102 determines, from stored information whether the identified individual has authorized use of information corresponding to the identified individual or an image of the identified individual. In various embodiments the privacy control server 102 makes the determination in step 208 based on such information stored in the customer record database 122. In various embodiments the stored information identifies authorized uses of information and/or images of the identified individual, authorized services or authorized web sites for which the user has indicated his/her image or other identification information may be used. In addition the stored information in some embodiments further includes restrictions set by the user or another handler as to how the biometric information is not be used, e.g., for commercial purposes and/or for sharing on a public domain. In some embodiments the information corresponding to the identified user includes at least one of user sharing preference information, user purchase history, web browsing information. In some embodiments when the sharing preference/authorization information for an individual of interest in not readily available but at least some contact information such as an email address, phone number, messenger identity (e.g., such as SKYPE ID and/or a chat messenger ID) is available to the privacy control server 102, the privacy control server 102 sends a request to the individual using the available contact information to specify if the individual has any objection to the use of information and/or images corresponding to the individual. In some such embodiments the privacy control server 102 also sends an invitation to the individual, as part of the request, encouraging the individual to create his/her profile on the privacy control server 102 for resolving future inquiries regarding the use of the individual's images and/or other information. For discussion purposes it is considered that a record corresponding to the identified individual exists in the customer record database 122.

In various embodiments steps 210 and 212 are performed as part of determining step 208. In step 210 the privacy control server 102 accesses a stored record corresponding to the individual of interest to check if the individual has authorized the use of information corresponding to the identified individual or an image of the identified individual. In step 212 a determination is made based on the accessed customer record information whether the identified individual has authorized the use of information and/or image. Since it is possible that a user may allow/authorize use of his/her information and/or images for some purposes, e.g., posting pictures or information on Facebook or any other social network by friends, dating sites, professional networking sites etc., while not authorizing use for other purposes such as by adult/porn sites, controversial/banned group websites, commercial uses etc., in some embodiments the determination in step 208 is also based on further additional information which may be either provided as part of the query in step 204 or obtained by the privacy control server 102 from other sources. Such additional information includes, for example: identification information of the device/server intending to use the images/information of the individual, purpose of use, whether the device/server intending to use would allow the individual to edit/delete the information later, whether the device/server intending to use is earning a profit by using the image of the individual, whether the device/server intending to use the image will likely use the individual's image or other information for political and/or advertisement campaigns etc. If it is determined that the identified individual has authorized the use of his/her information and/or image the operation proceeds from step 208 (including steps 210, 212) to step 214. In step 214 the privacy control server 102 generates a message, in response to the query, indicating the use of the information and/or image of the identified individual is authorized. Operation proceeds from step 214 to step 224.

If however in step 212 it is determined that the identified individual has not authorized the use of his/her information and/or image the operation proceeds from step 208 (including steps 210, 212) to step 216. In step 216 the privacy control server 102 generates a response message, in response to the query, indicating the use of information and/or image of the identified individual is not authorized. In some embodiments where the received biometric information includes an image of the identified individual the privacy control server 102 in step 218 generates a modified version of the image to be included in the response message as part of generating the response message. In some embodiments performing step 218 includes performing one or both of the sub-steps 220 and 222. In sub-step 220 a portion of the image which corresponds to the identified individual is altered, e.g., by blurring or blocking out some portion of the image of the identified individual. Alternatively or in addition to sub-step 220, in some embodiments sub-step 222 is performed wherein at least a portion of the face of the identified individual in the image is modified or replaced to render the individual unrecognizable in the modified version of the image. Thus in some embodiments a modified version of the image is included in the generated response message. In some other embodiments while a response message is generated in step 216 responding to the query, steps 218, 220 and 222 are not performed. Operation proceeds from step 216 to step 224.

Returning to step 224. In step 224 the privacy control server 102 transmits the generated message to the querying device in response to the query. Operation proceeds from step 224 to step 226. In step 226 the privacy control server 102 generates a report for the identified individual regarding received queries from one or more devices/servers, the report including images in which the individual was identified. In some embodiments the privacy control server 102 monitors and keeps track of the number of queries received for the plurality of individuals/customers and generates a report on a per customer basis, e.g., after a predetermined number of queries corresponding to the individual have been received. In some embodiments the report includes, in addition to the images in which the individual was identified, identification information corresponding to the querying device/server that inquired to use the information and/or images, a purpose of use if any was provided in the query, identification of a person/entity who wanted to post/tag the image and/or information of the individual using the querying server as the platform for posting etc.

Operation proceeds from step 226 to step 228. In step 228 the generated report is communicated by the privacy control server 102 to the identified individual, e.g., via an email and/or as a text message and/or or an online report file which can be accessed by the identified individual using a username/password combination provided by the privacy control server 102 to the individual. Operation proceeds from step 228 back to 204 and may be repeated for additional received queries corresponding to one or more individuals.

In some embodiments where a query includes an image including multiple individual, the privacy control server identifies individuals to which the information in the query corresponds. In some embodiments the privacy control server 102/300 uses image recognition, information specified in the query and information in the customer record database to identify individuals in a photo submitted as part of resolving a query. For each identified individual, the privacy control server 102/300 then checks the corresponding customer record and information sharing preferences and returns a reply based on the customer record information. When multiple individuals are included in the image provided as part of the query, the query response may and sometimes does include a copy of the image submitted as part of the query but with the images of the individuals who indicated a desire that their image not be used blocked out, blurred or otherwise indicated as being subject to a privacy request. Thus using the response, the querying party can determine which individual or individuals shown in an image has indicated a desire for their image not to be used in the manner intended by the querying party.

Figure 3:
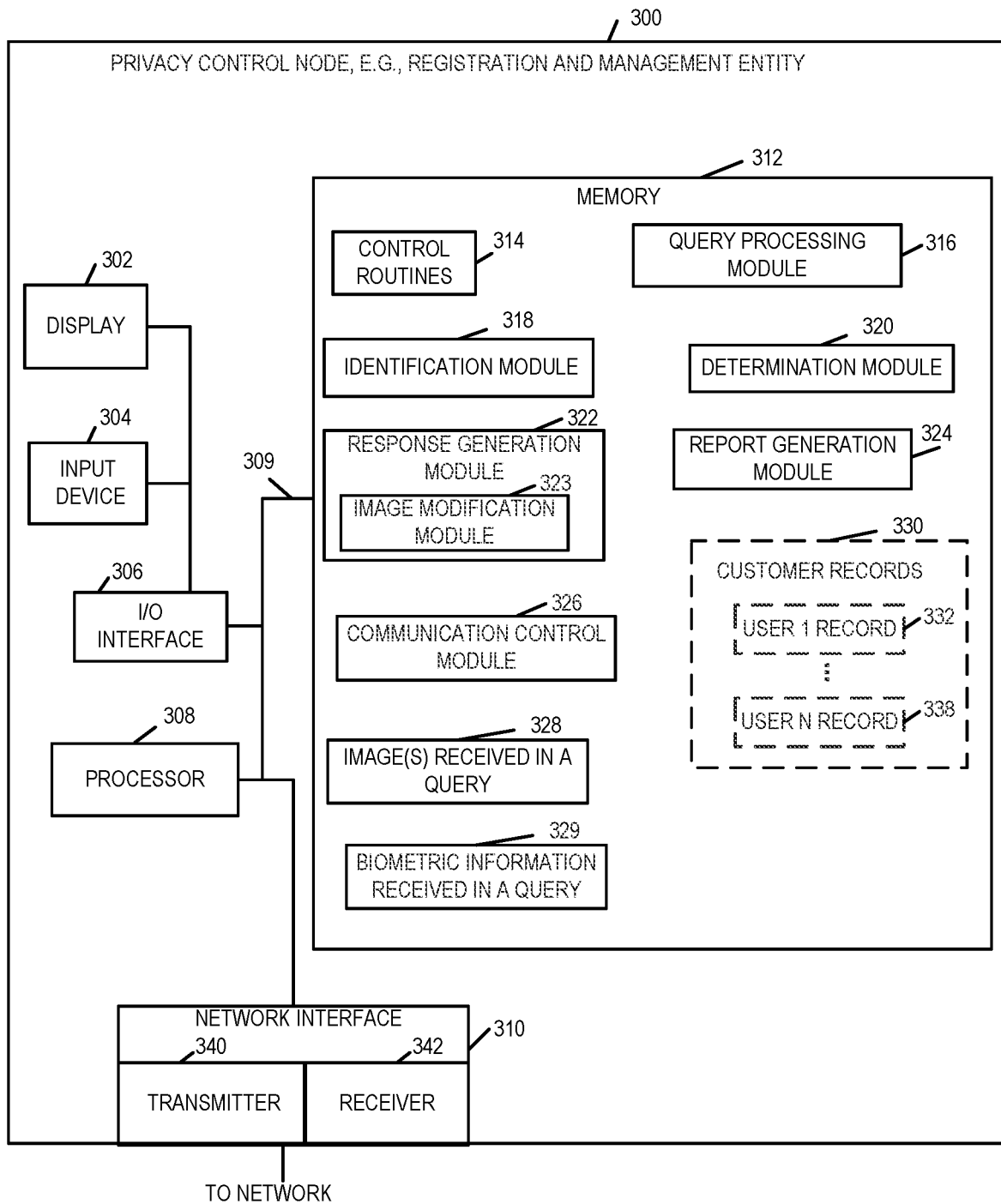
FIG. 3 illustrates an exemplary privacy control node (also referred to as the registration and management entity) implemented in accordance with one embodiment of the invention.

FIG. 3 illustrates an exemplary privacy control node 300, e.g., a registration and biometric information management node, in accordance with an exemplary embodiment of the invention. The exemplary privacy control node 300 may be used as the privacy control node 102 of FIG. 1 and is used in some embodiments is used to implement the methods of the present invention such as those shown in FIGS. 2 and 6. The registration and biometric information management node 300 is sometimes also referred to as privacy the Biometric Protection Bureau server since the node 300 works as a security and protection bureau for biometric information.

As illustrated, the privacy control node 300 includes a display 302, an input device 304, an input/output (I/O) interface 306, a processor 308, a network interface 310, and a memory 312. The various components of the privacy control node 300 are coupled together via bus 309 which allows for data to be communicated between the components of the privacy control node 300. The memory 312 includes control routines and modules. The processor 308, e.g., a CPU, executes various routines and/or modules and uses information stored in memory to control the privacy control node 300 to implement the methods of the present invention and operate in accordance with the invention. The processor 308 is responsible for controlling the overall general operation of the privacy control node 300. In some embodiments the processor 308 is configured to perform functions that have been discussed as being performed by the privacy control node 300.

The display 300 may be used by an administrator/operator to view information and/or images received by the privacy control node 300. The input device 304 may be a keyboard, touchpad, a voice controlled input device etc., via which input can be provided to the privacy control node 300, e.g., to provide information and/or change parameters for controlling the operation of the privacy control node 300.

Via the I/O interface 306, the privacy control node 300 can be coupled to an external device. Via the network interface 310 the privacy control node 300 communicates and/or receives signals and/or information (e.g., including queries, registration/enrollment requests, response messages and reports) to/from various devices over a communications network, e.g., such as communications network 105. The network interface 310 includes a transmitter 340 and a receiver 342 via which the transmitting and receiving operations are performed.

The memory 312 includes control routines 314, a query processing module 316, an identification module 318, a determination module 320, a response generation module 322, a report generation module 324, a communications control module 326, and data/information including images received in a query 328. In some embodiments the memory 312 further includes stored customer records 330 including customer records corresponding to a plurality of customers including user 1 record 332, . . . , and user N record 338. In various embodiments the stored customer records are created as part a registration process during which an individual user or another handler such as a parent/guardian of a minor provides biometric information corresponding to the individual along with sharing preferences and/or restrictions to be applied. In some embodiments while the customer records 330 are not stored within the privacy control node 300, the customer records 330 are accessible by the node 300 in a secure manner. The customer records 330 include the same or similar information as the customer record database 132.

The control routines 314 include device control routines and communications routines to control the operation of the privacy control node 300. The query processing module 316 is configured to process a query, e.g., received via the receiver 342 from a querying device, to recover and retrieve biometric information and/or image(s) included in the query for further processing, e.g., for further use by one or more other modules (e.g., such as the determination module 320, response generation module 322 etc.) which use the information included in a received query to make determinations and/or take further actions based on the information in accordance with the invention.

The identification module 318 is configured to identify an individual based on the received information in a query. The information received in a query may include, e.g., actual captured biometric information, e.g., biometric samples, or templates extracted from captured biometric information. In various embodiments the identification module 318 uses the information included in the received query to identify the individual for whom it is to be determined whether use of information and/or image is authorized or not. In some embodiments the received biometric information includes an image of the individual and the identification module 318 analyses the received image to recognize features of the individual in the image, generate identification data from the image using recognized features and compare the identification data against the biometric information and/or identification data and/or images of customers stored in the customer records 330. The stored biometric information and/or identification data may include images of the individual and/or user features such as eye spacing, eye color, height, and/or information indicating one or more facial characteristics that may be used for facial recognition to identify the individual in images provided by others. In some embodiments based on the comparison the identification module 318 determines if there is a match and whether a record corresponding to the individual exists in the customer records 330. In some embodiments where a query includes other information corresponding to the individual, in addition to or as an alternative to an image, the identification module 318 uses this information to identify the individual, e.g., by comparing the received identification information to the identification data, e.g., biometric data and other information in the user profile, of customers stored in the customer records 330.

The determination module 320 is configured to determine, from stored information included in customer records 330, whether the identified individual has authorized use of information corresponding to the identified individual or an image of the identified individual. As discussed earlier the user records 332 through 338 corresponding to various individuals include information indicating authorized uses of information and/or images of the individuals to whom the records correspond, authorized services and/or authorized web sites for which the individuals have indicated their information and/or images may be used. Thus once an individual is identified by the identification module 320 as discussed above, the determination module 320 uses the information in a user record corresponding to the identified individual to check the sharing preference/authorization information and determine whether the identified individual has authorized use of his/her information and/or images.

The response generation module 322 is configured to generate a response message, in response to the query, indicating whether or not the use of information and/or images of the identified individual is authorized. In some embodiments when the determination module 320 determines that the identified individual has not authorized use of his or her information and/or image the response generation module 324 is configured to generate a response message indicating the use of image of the identified individual is not authorized. In some embodiments the response generation module 322 includes an image modification/alteration module 323 configured to generate a modified version of an image of the individual, e.g., image included with the query. In some such embodiments the modified version of the image is included in the generated response message indicating the use of information and/or image of the identified individual is not authorized. In some embodiments the modified version of the image includes an alteration to a portion of the image which corresponds to the identified individual. In some embodiments the alteration of the portion of the image is performed by the image modification module 323 by blurring or blocking out of some of the portion of the image which corresponds to the identified individual. In some embodiments the alteration of the portion of the image is performed by the image modification module by modifying or replacing at least a portion of the face of the identified individual in the image to render the individual unrecognizable in the modified version of said image.

In various embodiments the response generation module 324 is further configured to generate a response message indicating the use of information and/or image of the identified individual is authorized when the determination module 320 determines that the identified individual has authorized use of his or her image. In some such embodiments the response message indicating the use of information and/or image of the identified individual is authorized includes the unmodified image, e.g., as received in the query. In various embodiments the communications control module 326 is configured to control the transmitter 340 to transmit a response message generated by the response generation module 322 to a device, e.g., querying server or other node sending the query, in response to the query. As should be appreciated depending on the determination the response message may indicate either that use of individual's information and/or image is authorized or that use is unauthorized.

The report generation module 324 is configured to generate a report regarding received queries including images in which the identified individual was identified. In some embodiments the report generation module 324 is configured to generate the report after a predetermined time period, e.g., every 24 hours or 48 hours in order to provide a report to the customer once a day or once every two days. In some other embodiments the report generation module 324 is configured to generate the report after a predetermined number of queries corresponding to a given individual have been received. In various embodiments the communications control module 326 is configured to control the transmitter to send the report to a device corresponding to the identified individual.

The data/information stored in memory includes images received in a query 328, biometric information received in a query 329, and customer records 330. The biometric information 329 received in a query may include age, height, gender, weight, other biometric data including measurable physical characteristics including facial characteristics, face geometry, finger prints, retina patterns for retinal scan recognition, iris recognition patterns and/or other recognizable/measurable features. The measurable facial characteristics/features may include data indicating user features such as eye spacing, eye color, nose width etc. The information included in customer records 330 has been discussed above and is discussed in more detail with regard to FIG. 4.

In some embodiments the modules shown in FIG. 3 are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

While shown in FIG. 3 example to be included in the memory 312, the modules shown included in the privacy control node 300 can, and in some embodiments are, implemented fully in hardware within the processor 308, e.g., as individual circuits. The modules can, and in some embodiments are, implemented fully in hardware, e.g., as individual circuits corresponding to the different modules. In other embodiments some of the modules are implemented, e.g., as circuits, within the processor 308 with other modules being implemented, e.g., as circuits, external to and coupled to the processor 308. As should be appreciated the level of integration of modules on the processor and/or with some modules being external to the processor may be one of design choice. Alternatively, rather than being implemented as circuits, all or some of the modules may be implemented in software and stored in the memory 312 of the privacy control node 300, with the modules controlling operation of the privacy control node 300 to implement the functions corresponding to the modules when the modules are executed by a processor, e.g., processor 308 In still other embodiments, various modules are implemented as a combination of hardware and software, e.g., with another circuit external to the processor providing input to the processor 308 which then under software control operates to perform a portion of a module's function.

While shown in the FIG. 3 embodiment as a single processor, e.g., computer, it should be appreciated that the processor 308 may be implemented as one or more processors, e.g., computers. When implemented in software the modules include code, which when executed by the processor 308, configure the processor 308 to implement the function corresponding to the module. In embodiments where the various modules shown in FIG. 3 are stored in the memory 312, the memory 312 is a computer program product comprising a computer readable medium comprising code, e.g., individual code for each module, for causing at least one computer, e.g., processor 308, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 3 control and/or configure the privacy control node or elements therein such as the processor 308, to perform the functions of corresponding steps illustrated and/or described in the flowchart 200 and/or flowchart 600.

FIG. 4 illustrates an exemplary customer record database 400 including exemplary customer records corresponding to different users in accordance with one exemplary embodiment. The exemplary customer record database 400 may be used as the customer record database 132 of FIG. 1 and/or the customer record 330 of FIG. 3. In some embodiments the customer record database 400 is stored in the privacy control node 102/300. In some other embodiments the customer record database 400 including customer records may be stored externally at a secure site, with the privacy control server 102/300 being able to securely access, use, manage and/or maintain the customer record database 400.

The customer record database 400 includes customer records corresponding to a plurality of individuals/users including user 1 record 402, . . . , and user N record 420. Each of the customer records 402 through 420 includes customer user imposed use restrictions and/or sharing preference information corresponding to the individual/customer to which the record corresponds. The use restrictions and/or sharing preference information indicates authorized uses and/or restrictions on the use of user's information, e.g., biometric information including images of the individual or other biometric data such as fingerprints, voice samples, signature/handwriting sample, iris recognition sample, retina recognition sample or other such data. In some embodiments the use restrictions and/or sharing preference information further indicates authorized services and/or authorized web sites for which the individual has indicated his/her information and/or image may be used. The information stored in each of the user records may be received and/or obtained by the registration and management node 300 as part of the registration, e.g., enrollment, process in some embodiments, which is illustrated in flowchart 600 and discussed in detail below with regard to FIG. 6.

As shown, user 1 record 402 includes information corresponding to a first user including user name 403, user information 404, user provided sample image(s) and information 406, generated biometric templates 407, use and/or access preferences for images or facial recognition template 408 and use and/or access preferences for other biometric information corresponding to the user 414. The use and/or access preferences information is sometimes also referred to as sharing preference information.

The user name field 403 includes the name of the individual (e.g., JOHN SMITH in the example) to whom the user 1 record 402 corresponds. The user information 404 includes biometric data and/or other information corresponding to the user that can be used for identifying the user and may include, e.g., age, height, gender, weight, biometric information including measurable physical characteristics including facial characteristics, face geometry, finger prints, voice/speech sample for voice recognition, retina patterns for retinal scan recognition, iris recognition patterns and/or other recognizable/measurable features. The measurable facial characteristics/features may include data indicating user features such as eye spacing, eye color, nose width etc. It should be appreciated that such identification information can be and in various embodiments is used by the privacy control server 300 to identify an individual for whom a query with biometric information or extracted template is received. While in some embodiments the identification information data is provided by the user it should be appreciated that an average individual is normally not aware of the actual measurements and/or data indicating his/her physical characteristics discussed above. Thus in such cases, e.g., where facial recognition is to be performed to confirm a user's identity, such biometric data including measurable physical characteristics of a user is generated in some embodiments by the privacy control node 102/300 based on information and/or sample images provided by the user or is obtained by the privacy control node 102/300 from a user approved third party service provider. In addition to or as part of the user information 404 the user 1 record 402 further includes one or more sample images 406 of the individual which may be used for identification and comparison purposes in accordance with the features of the present invention. The extracted recognition templates 407 includes templates extracted using biometric information 404, e.g., by performing additional processing on the biometric samples to extract features sets/data that can be used for comparison/matching against information received in queries. Thus for each type of biometric data included in the biometric information 404 there is a corresponding template included in the extracted template 407, for example, fingerprint template, voice/speech template, signature/handwriting template, iris recognition template, retina recognition template etc.

Image sharing preference/authorization information 408, also referred to as use and/or access privilege information, include the sharing preference/authorization settings corresponding to the individual to whom the user 1 record 402 corresponds. The sharing preference/authorization information 408 identifies authorized uses of images of the identified individual, authorized services and/or authorized web sites for which the individual has indicated his/her image may be used. In the illustrated example of FIG. 4 the sharing preference/authorization information 408 is shown in tabular form. Column 410 includes a list of authorized networks and websites which are authorized to use, e.g., post/publish images and/or information of the individual, i.e., user 1. As shown in column 410, in the illustrated example various websites/networks which are authorized to use images and/or information of user 1 include: Facebook, Twitter, Pinterest, Match.com, Google+, Tumblr, Career.com, Linkedin etc. Thus if a server corresponding to any of these websites sends a query to determine if the use of the individual (e.g., user 1) image is allowed the privacy control node 102/300 will likely respond with an approval/authorization to use based on the information specified in column 410. In some embodiments if a network, service provider and/or website, which is included in the list of user authorized networks/websites such as the list shown in column 410, frequently sends queries to the privacy control node 102/300 for authorization approval then the privacy control node 102/300 may and in some embodiments does send a response with an authorization approval that also indicates that the network/website is on an authorized list and thus need not send queries again and again. If the user changes his/her preferences that modifies the list in column 410, e.g., removing ones or more of such previously authorized networks/websites from the list, then the privacy control node 102/300 may then send a message to these networks/websites the user authorized network/website list has changed and thus these networks/websites need to resume querying the privacy control node 102/300 for approval.

Column 412 includes a list of authorized uses of the individual's images and/or information. As shown in column 412, in the illustrated example authorized uses of the individual's (user 1) images and/or information include: for use in social networking on a group and/or on social networks including popular social networking websites; for use in professional networking; for use on dating websites and/or dating groups; for use in social work/non-profit projects including social work/non-profit websites and/or groups; for use in employment related/job hunting networks and websites; for use in humanitarian work related projects including humanitarian work promoting websites and/or groups; for use by political campaigns supported by the individual; for use in community service related projects including community service promoting websites and/or groups etc.

Use and/or access preference/authorization information 414 includes authorized uses and restrictions regarding various other types (e.g., other than image/facial recognition information) of biometric information and/or templates corresponding to the user that are stored in user record. Similar to the information set 408, the use and/or access preference/authorization information 414 identifies authorized uses of each of the other types of biometric data corresponding to the user stored in user record, e.g., as information 404 and/or 407. Column 415 includes various types of stored biometric samples and/or numerical templates while column 416 includes information indicated authorized uses and/or access preference corresponding to these biometric samples and/or numerical template.

Consider the first row of columns 415, 416. The first entry in column 415 identifies the biometric information and/or template which in the present example is handwriting and/or signature data, e.g., sample or corresponding template. The corresponding entry in the same first row of column 416 indicates the authorized uses set by the user for the handwriting and/or signature data which in the present example is indicated to be "financial transactions and identity verifications". Thus it can be appreciated that the user has authorized that his/her handwriting/signature samples or templates extracted therefrom can be used for resolving requests relating confirmation of user's identity and/or financial transactions in which verification of user's signature or writing patterns is needed. For example a bank may request signature or handwriting verification from the registration and management entity 300, e.g., upon receiving a check with user's signature or as another example when the user inputs his/her signature in person using a touch sensitive interface like the ones seen in many banks, to verify the signatures and/or identity of the user by matching signatures.

Similarly consider the second row of columns 415, 416. The second entry in column 415 identifies the biometric information and/or template as "fingerprint data", e.g., fingerprint sample or corresponding template. The corresponding entry in the same row of column 416 indicates that the authorized uses for fingerprint biometric data is "site/object access". Thus the stored fingerprints and/or corresponding template is authorized to be used for resolving requests related to access of objects such as electronic devices, e.g., laptops, phones, tablets and/or other machines, as well as access to physical sites, e.g., restricted buildings, vehicles, entry doors etc., which require match of fingerprints prior to granting access to such objects/sites. Continuing with the example consider the third row of columns 415, 416. The third entry in column 415 identifies the biometric information and/or template as "retina/iris data", e.g., retina/iris recognition pattern sample or corresponding extracted template. The corresponding entry in the same row of column 416 indicates that the authorized uses for this biometric data is again "site/object access". Similarly the last entry in column 415 identifies the biometric information and/or template as "voice/speech data", e.g., voice/speech sample or corresponding extracted template. The corresponding entry in the same row of column 416 indicates that the voice/speech data can be used for resolving requests pertaining to identity verifications as well as site/object access.

In various embodiments the registration and management node 300 can not use or allow the use of user's biometric information for anything beyond what the user has authorized it to do. In some embodiments the user may allow the use of stored biometric information for all identification and verification purposes but with certain specified exceptions that the user indicates by providing special instructions. Such special instructions and/or restrictions are also stored in the user record in some embodiments in addition to or as part of information sets 408 and 414.

In some embodiments in addition to the authorized uses of images of the identified individual (such as those included in column 412) and authorized services and/or authorized web sites (such as those included in column 410) for which the individual has indicated his/her image may be used the user records 402, 420 further includes information indicating specific unauthorized/prohibited websites and uses for which the individual has indicated his/her image can not be used. For example, a list of unauthorized/prohibited websites including adult websites that host graphic content may be included in the user records 402, 420. Similarly a list of unauthorized/prohibited uses of the user's image may also be specified including, for example, use in advertising/marketing, use on an adult/porn site, use on a race supremacy website or group etc. Furthermore in some embodiments the user record 402 further includes information indicating a list of persons, groups, entities that are authorized to use, e.g., post, publish and/or share online, the individual's image on one or more websites, e.g., social and/or professional networking websites. Such persons, groups, entities may be identified by name and/or some other identifier. User N record 420 may include similar information corresponding to the individual to whom the user N record corresponds, i.e., user N.

Figure 5:
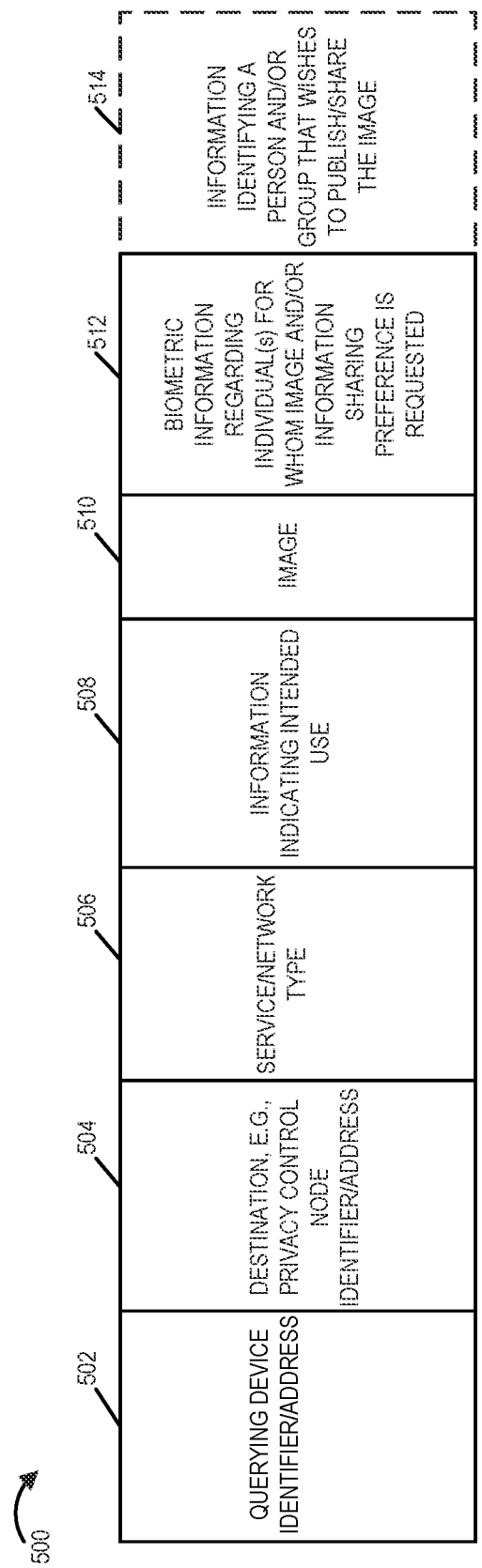
FIG. 5 illustrates an exemplary query sent from a querying device to the exemplary privacy control server, in accordance with one exemplary embodiment.

FIG. 5 illustrates an exemplary query 500 sent from a querying device to the exemplary privacy control server 300/102, in accordance with one exemplary embodiment. In some embodiments the query 500 includes information and one or more images of an individual for checking by the privacy control node 102/300 to determine if the images or other information communicated by the query 500 corresponds to a user who has restricted use of his/her image or other information in a public manner. The query 500 includes a querying device identifier field 502, a destination identifier/address field 504, service/network type field 506, an intended use field 508, an image 510, biometric information regarding the individual for which authorization information is requested 512, and information identifying a person or group that wishes to publish/share the image of the individual 514. While image 510 and biometric information 512 are separately shown in the example of query 500 however the biometric information received in a query may actually include an image of the individual. Thus in some embodiments the image field 510 is optional. The information field 514 of the query 500 is optional and thus may not be used in a query in all embodiments.

The querying device identifier field 502 includes identification information corresponding to the querying device sending the query 500. The identification information in field 502 may include, for example, domain name of a network/service associated with the querying device, an actual IP address and/or other address, a URL (Uniform Resource Locators) or another identifier corresponding to the querying device/server via which the querying device/server can be identified and/or contacted. The destination identifier/address field 504 includes identifier and/or address information corresponding to the final destination device, e.g., the privacy control node 300. The destination address may include IP address and/or other address of the destination device to which the query 500 is directed and may be used for routing the query 500 via one or more intermediate nodes.

The service/network type field 506 includes information indicating the type of service and/or type of network with which the querying device is associated. For example the service/network type field 506 may indicate that the type of service and/or type of network associated with the querying device is a social network such as Facebook, a professional network such as Linkedin, a dating service such as match.com or the like. In some embodiments the privacy control node 102/300 receiving the query 500 can infer a potential use of an individual's image from the information in field 506 even if an intended use in not specified in the query.

The intended use field 508 includes information indicating the intended use of the image included in field 510. The intended use may include use for, e.g., one of: commercial purposes, advertising/marketing purposes, social networking/sharing with a plurality of individuals on a social network, professional networking purposes, for use on a dating site or group, for use in social work, non-profit, community service and/or charity related projects etc. The image field 510 includes at least one image of the individual who is the subject of the query, e.g., for which it is to be determined whether the use of the image and/or information corresponding to the individual is authorized.

Biometric information field 512 includes biometric data corresponding the individual(s) for whom image and/or information sharing preference is requested to determine if the use of image and/or information is authorized. The biometric information 512 may include, for example, actual name and/or username, age, gender, height, weight, other biometric data including measurable physical characteristics including facial characteristics (e.g., such as data indicating user features such as eye spacing, eye color, nose width etc.), face geometry, finger prints, retina patterns for retinal scan recognition, iris recognition patterns and/or other recognizable/measurable features and/or other information corresponding to the individual. The information included in field 512 can be used by the privacy control node 102/300 to identify the individual, e.g., in order to look up corresponding customer record in the database 400.

Information field 514 includes identification information identifying a person, entity or group that wishes to publish/share the image 510 and/or biometric information 512 of the individual. In some embodiments where identification information field 514 is used the information may include the name of a person or a group that wishes to use the image 510 and/or information 512 on the network/website associated with the querying device sending query 500. For example consider that the querying device is a social networking website server that is not included in the authorized list 410 of FIG. 4 and the information field 514 indicates that a person, e.g., named "Michael Hart", wants to post the image 510 and/or use information 512 corresponding to the individual included in the query 500 on the social networking website identified in field 502 or field 506. In such a case using the privacy control node 300 checks if the name "Michael Hart" is specified in the user 1 record 402 as a person, group, or entity that is authorized to use, e.g., post, publish and/or share online, the individual's image on one or more websites. If there is a match then the privacy control node 300/102 sends an approval for use of the image 510 to the querying device.

Figure 6:
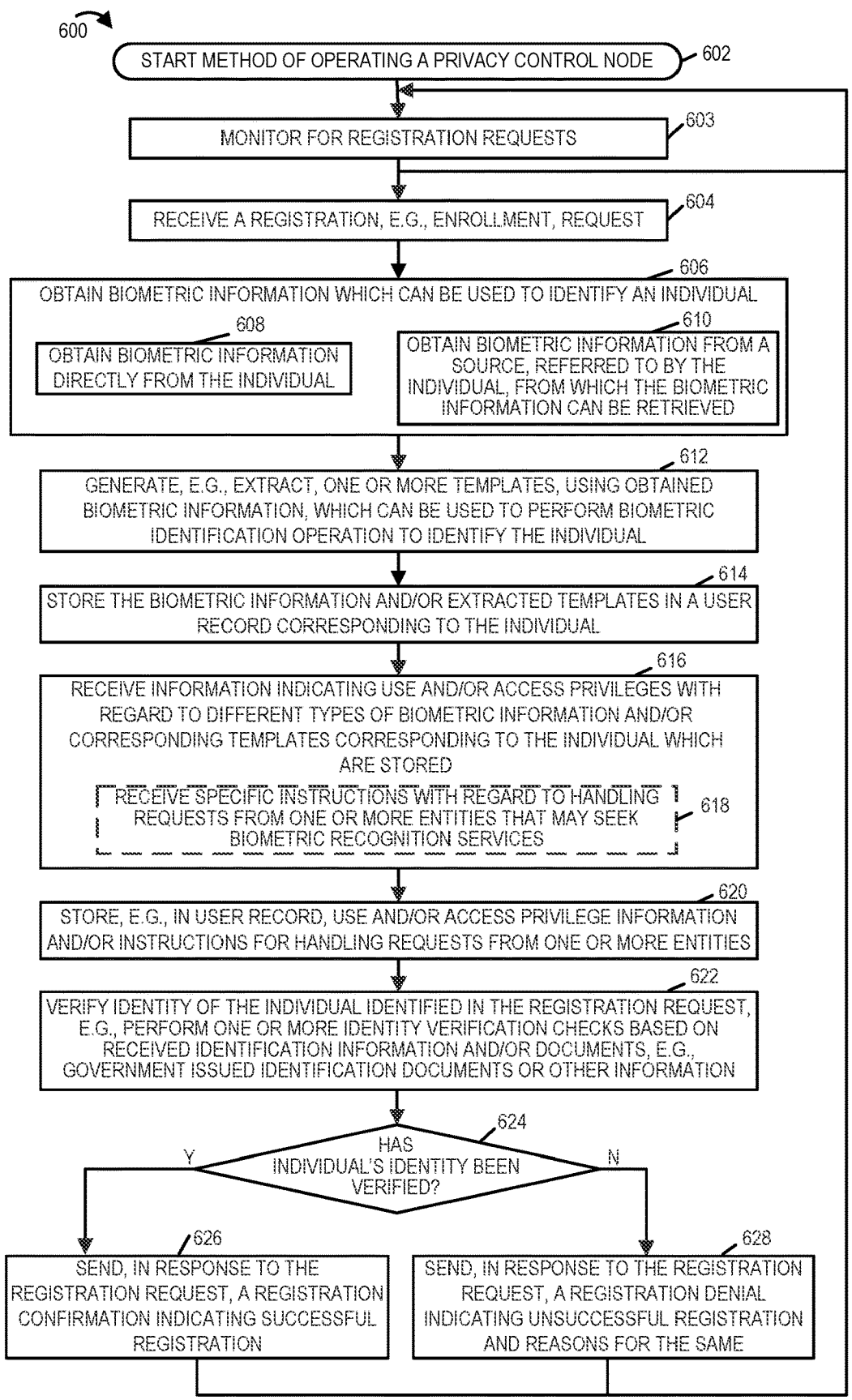
FIG. 6 is a flowchart illustrating the steps of an exemplary registration, e.g., enrollment, method implemented by the exemplary registration and management entity in accordance with an exemplary embodiment.

FIG. 6 is a flowchart 600 illustrating the steps of an exemplary registration, e.g., enrollment, method implemented by the exemplary registration and management entity 300/102 in accordance with an exemplary embodiment. The exemplary method starts in step 602 with the registration and management entity 300/102 being powered on and starting to monitor for registration requests, e.g., request to enroll. Using the method of flowchart 600 various users are enrolled/registered with the privacy control node/registration and management entity 300/102 which collects biometric samples corresponding to individuals during this process, generates numerical templates for future comparisons and stores the received biometric samples and/or numerical templates. The biometric information (and corresponding template) include the same type of information as discussed earlier, e.g., as with regard to user records of FIG. 4.

Operation proceeds from start step 602 to step 604. In step 604 the privacy control device receives a registration, e.g., enrollment, request from a user device corresponding to an individual. The registration request indicates a user's request to have his/her biometric information and/or other identification information be stored and managed by the control node 300/102 in accordance with the user's indicated preferences and/or restrictions. The registration request may be sent by the individual intending to create a biometric information profile or by the parent or guardian in case of a minor.

Operation proceeds from step 604 to step 606. In step 606 the privacy control server 102 obtains biometric information (and/or corresponding template) corresponding to an individual. In some embodiments step 606 is performed as part of step 604 of receiving the registration request. Depending on the case and availability of such information one of the steps 608 or 610 is performed in some embodiments as part of step 606. In some embodiments step 608 is performed where the registration and management node obtains the biometric information directly from the individual, e.g., the user to whom the registration request corresponds, e.g., separately or as part of receiving the registration request. In some other embodiments step 610 is performed wherein the biometric information and/or corresponding template is obtained from a source, e.g., a third party, referred to by the sender of the registration request. In some such embodiment the user sending the registration request may provide identifying credentials and/or information that would allow the registration and management entity 300 to obtain the biometric information corresponding to the user from the third party.

Operation proceeds from step 606 to step 612 where the registration and management entity 300 generates one or more templates, using obtained biometric information, which can be used to perform biometric identification operations to confirm the identity of the individual, e.g., in response to queries from one or more entities such as 104, 106, 108 etc. It should be appreciated that step 612 is performed in some embodiments where captured biometric information, e.g., raw biometric samples, are obtained in step 606. In the cases where the node 300 receives extracted numerical templates instead of biometric samples there is no need to perform step 612 and in such cases step 612 is skipped.

Operation proceeds from step 612 to step 614. In step 614 the obtained biometric information and/or extracted templates are stored in a user record corresponding to the individual, e.g., such as user record 402. In some embodiment a user record is created by the registration and management entity 300, if one already doesn't exist in the customer database 330, upon receiving the registration request and obtaining the biometric information. Operation proceeds from step 614 to step 616. In step 616 the node 300 receives information indicating use and/or access privileges with regard to one or more different types of biometric information and/or corresponding templates corresponding to the individual which are stored. In some embodiments the user and/or entity representing the user provides, e.g., on its own or in response to an opportunity given by the registration entity 300, use and/or access privileges with regard to the one or more different types of stored biometric information and/or corresponding templates. The use and/or access privileges (also sometimes referred to as sharing preference) for a given type of biometric modality, e.g., image/facial recognition data, fingerprints, signature sample, voice sample etc., providing preferences and/or restrictions set by the user or the handler as how the given type of biometric information can or can not be used. In some embodiments a user and/or the user's representative sets access restrictions and also restrictions on when biometric information of the given type can be used by another entity. For example the use and access information may indicate that handwriting/signature samples and/or templates can be authorized for use with regard to checking credit card, check and/or other financial transactions but not for other purposes. It may be specified that fingerprint information maybe authorized by the user for access to objects such as electronic devices or actual physical sites but not for general distribution or for other purposes, images maybe authorized for use for non-commercial purposes such as on facebook and/or other websites but not for commercial purposes. Handwriting/signature samples and/or templates can be authorized for use with regard to checking credit card, check and/or other financial transactions but not for other purposes. In addition to being able to set specific uses for specific types of information the user can also restrict such uses to particular entities. For example the user may specify that signature and/or writing information is authorized for use by banks and/or credit card companies explicitly specified by the user, e.g., ones used by the user, but not other entities, e.g., lenders, credit unions, brokers etc. In some embodiments as part of step 616 sub-step 618 is performed where the node 300 receives specific instructions regarding handling queries/requests from one or more specific entities that seek biometric and/or identity recognition assistance. For example the user can specify that any request for identity verification through the use of stored biometric information from a government agency should be denied. As another example the user can specify that any request for use of images from an adult/explicit content hosting website server should be denied.

Operation proceeds from step 616 to step 620 where the node 300 stores, e.g., in the user record corresponding to the individual, received use and/or access privilege information and the instructions for handling the requests from one or more specific entities. Operation proceeds from step 620 to step 622. In step 622 the registration node 300 verifies the identity of the individual identified in the registration request or to whom the registration request corresponds, e.g., by performing one or more identity checks using received identification credentials. The identification credentials may be in the form of information provided along with the registration request such as driver license number, social security number, name, address etc. and/or any combination of such information which can be used to verify that the individual is actually who he/she claims to be. The identification credentials may also be in the form of actual documents corresponding to the registering individual, e.g., such as government issued documents such as verified/certified copies of one or more of drivers license, passport pages, birth certificate, band issued ATM card etc. The identification credentials may be received as part of the registration request or may be requested by the node 300 separately.

Operation proceeds from step 622 to step 624 where the registration and management entity 300 determines whether the identity of the individual requesting registration has been verified in the manner discussed above. If the identity has been verified the operation proceeds from step 624 to step 626. In step 626 the registration and management entity 300 sends, in response to the registration request, a registration confirmation indicating successful registration of the individual and corresponding biometric data with the registration and management entity 300. If in step 624 it is determined that the identity of the individual can not be verified, e.g., due to lack or insufficient identification credentials, the operation proceeds from step 624 to step 628. In step 628 the registration and management entity 300 sends, in response to the registration request, a registration denial indicating unsuccessful registration and optionally also providing reasons for the denial. Operation proceeds from step 626 or step 628 back to step 603 where the registration and management entity 300 monitors for additional registration requests and the process may be repeated for additional received registration requests.

Registration, management of biometric information, e.g., stored templates, and/or authorization functions are supported by the registration entity in some embodiments. In various embodiments a user contacts the system to register with regard to the biometric management and authorization service. The user and/or entity such as, a legal guardian, authorized to act on behalf of someone being registered, e.g., a minor such as a child, is authenticated and then provides the system one or more samples of biometric information corresponding to one or more different modalities. The biometric information is stored and/or processed to generate recognition templates that can be used to identify the individual being registered. Alternatively, the user provides the system the authority to access and retrieve biometric information, e.g., raw input data such as images of the user, a user's fingerprints, and/or templates which can be used for biometric recognition operations from one or more other sources, e.g. facebook, government records, such as driver's license or passport records, etc. The system receiving the biometric input and/or authorization to retrieve such input, stores the provided or retrieved biometric information and/or templates. Received or retrieved biometric information is processed to generate templates, e.g., of one or more features of the biometric information, which can be used to determine if there is a match between captured or supplied biometric information and the information/templates corresponding to an individual user who has registered with the system.

The biometric information and/or templates which can be used for matching the user to supplied input, e.g., an image, writing sample, fingerprint, are stored in a record corresponding to a user. The user and/or entity representing the user is provided the opportunity to set use and/or access privileges with regard to the different types of stored biometric information and/or corresponding templates. For example, in some embodiments images and/or recognition templates corresponding to a user are stored, writing samples and/or writing templates that can be used to determine if a writing sample corresponds to the user to whom the record corresponds and/or other types of distinct biometric information such as fingerprints are stored. A user and/or the user's representative sets access restrictions and also restrictions on when biometric information of the given type can be used by another entity. For example, fingerprint information maybe authorized by the user for access to laptops and/or other electronic devices owned or issued to the user, e.g., by the government or an employer, but not for general distribution or for other purposes. Facial images maybe authorized for use for non-commercial purposes such as on facebook and/or other websites but not for commercial purposes.

Handwriting/signature samples and/or templates can be authorized for use with regard to checking credit card, check and/or other financial transactions but not for other purposes. In addition to being able to set specific uses for specific types of information the user can also restrict such uses to particular entities. For example the user may specify that signature and/or writing information is authorized for use by banks and/or credit card companies explicitly specified by the user, e.g., ones used by the user, but not other entities.

A user may also specify whether the underlying biometric sample and/or template can be provided to entities the user authorizes to use such information or the entities are restricted to providing sample and/or extracted feature sets for testing to determine if they match a user's stored identification information. In some embodiments a party seeking identification of a user and which provides a sample or set of extracted features to the registration and management service is required to specify not only the requesting party's identity but also the intended use of the identification confirmation requested and/or intended use of the supplied biometric data.

A user can specify a requested action to be taken in some embodiments when a party provides a sample which matches the biometric information corresponding to a user but the entity providing the sample or extracted features is not authorized to use the information or/or not authorized to receive an identity confirmation. For example that information may indicate that the image of the user's face should be blurred or replaced with an image of another individual. With regard to a request for a confirmation of a fingerprint that is for an unauthorized purpose or use, the user may specify that the response should be "no match found" or "requested use not permitted" even where a match is found. The user may also request notification of attempted unauthorized use of his/her biometric information with the user being notified of the request and in some cases the requesting party. In this way the system can act like a credit alert service but with regard to attempted use of biometric data helping to put a user on the alert when his/her biometric information is being used. Similarly, even in cases where user of biometric information is authorized, a report of such use, the party using the information, and the indicated purpose of the use can be made. A user can subscribe to reports with regard to use of his/her biometric information and receive a report similar to a credit report but instead listing when, by whom and for what purpose other users and/or entities tried to use or check on a user based on one or more biometric samples or sets of biometric features.

Accordingly, the service of the present invention help a user to take control of use of his/her biometric information by serving as a bureau or other entity which can check biometric information against known information of users, control the use of such checks and/or biometric information, and/or generate reports and/or alerts which can be supplied to a user regarding checks made on the user or attempts to use the individual's biometric information and/or templates for one or more purposes.

An exemplary method of operating a privacy control node, comprises: receiving a query including captured biometric information which can be used to identify one or more individuals; identifying an individual based on the received biometric information; and determining from stored information whether the identified individual has authorized use of information corresponding to the identified individual or an image of the identified individual. In some embodiments the biometric information includes weight or a fingerprint scan of the user. In some embodiments the information corresponding to the identified user includes at least one of user preference information, user purchase history, web browsing information. In some embodiments the stored information includes authorized uses of information corresponding to the identified individual, authorized uses of images of the identified individual, authorized services or authorized web sites for which the individual has indicated his/her image may be used.

In some embodiments the method further comprises responding to the query with a message indicating that use of images of the identified individual is not authorized. In some embodiments the captured biometric information is an image and the response to the query includes a modified version of said image. In some embodiments the modified version of the image includes an alteration to a portion of the image which corresponds to the identified individual. In some embodiments the alteration of the portion of the image includes blurring or blocking out of some of the portion of the image which corresponds to the identified individual. In some embodiments the alteration of the portion of the image includes modifying or replacing at least a portion of the face of the identified individual in the image to render the individual unrecognizable in the modified version of said image.

In some embodiments the query includes information indicating the intended use of the image. In some embodiments the method further comprises providing the identified individual with a report regarding received queries including images in which the identified individual was identified. In some embodiments the query includes information indicating that the intended use of the image is for one of: commercial use or advertising/marketing use. In some embodiments the query includes information indicating that the intended use of the image is for one: non-profit fundraising campaign, a humanitarian project, a social work related project, or non-commercial activity.

An exemplary privacy control node, e.g., registration and biometric information management node, implemented in accordance with some embodiments comprises: a receiver configured to receive a query including captured biometric information (and/or corresponding template) which can be used to identify one or more individuals, and a processor configured to i) identify an individual based on the received biometric information, and ii) determine, based on stored information, whether the identified individual has authorized use of information corresponding to the identified individual or an image of the identified individual. In some embodiments the privacy control node further comprises: memory including the stored information, the stored information identifying authorized uses of information corresponding to the identified individual, authorized uses of images of the identified individual, authorized services or authorized web sites for which the individual has indicated his/her image may be used.

In some embodiments the processor is further configured to generate a response message, in response to the query, indicating that use of images of the identified individual is not authorized, the response message indicating that use of images of the identified individual is not authorized being generated when the determination module determines that the identified individual has not authorized use of his or her image. In some embodiments the privacy control node further comprise a transmitter configured to transmit the response message to a device in response to the query. In some embodiments the processor is configured to control the transmitter to transmit the response message to a device in response to the query. In some embodiments the captured biometric information is an image and the processor is further configured to generate a modified version of the image, and include the modified version of the image in the response message. In some embodiments the modified version of the image includes an alteration to a portion of the image which corresponds to the identified individual. In some embodiments the processor is further configured to perform the alteration of the portion of the image by blurring or blocking out of some of the portion of the image which corresponds to the identified individual. In some embodiments the processor is configured to perform the alteration of the portion of the image by modifying or replacing at least a portion of the face of the identified individual in the image to render the individual unrecognizable in the modified version of the image.

In some embodiments the processor is further configured to generate a report regarding received queries including images in which the identified individual was identified and control the transmitter to send the report to the identified individual.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

Various embodiments are possible beyond those which have already been described and the invention is not limited to the particular examples which have been discussed above.

The techniques of various embodiments may be implemented using software, hardware and/or a combination of software and hardware. Various embodiments are directed to apparatus, e.g., control nodes/security servers. Various embodiments are also directed to methods, e.g., method of controlling and/or operating a communications device, e.g., a privacy control node and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

In the above described methods, in some embodiments, each step may be performed by one or more different software instructions executed by a computer processor, e.g., a central processing unit (CPU). Various apparatus and/or systems implemented in accordance with the present invention include means for implementing each of the various steps which are part of the methods of the present invention. Each means may be, e.g., an instruction, processor, hardware circuit and/or combination of elements used to implement a described step.

In various embodiments, nodes described herein are implemented using one or more modules to perform the steps corresponding to one or more methods, for example, query processing, receiving and/or transmitting steps. Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., devices such as user equipment device (UEs), and/or control nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., privacy control node and/or a user device, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Numerous additional embodiments, within the scope of the present invention, will be apparent to those of ordinary skill in the art in view of the above description and the claims which follow. Such variations are to be considered within the scope. In various embodiments the user device are mobile nodes which are implemented as notebook computers, personal data assistants (PDAs), or other portable devices including receiver/transmitter circuits and logic and/or routines, for implementing the methods.

What is claimed is:

1. A method of operating a privacy server, the method comprising:

storing, in storage device, a first user record of a customer record database, a first user name, a user provided sample image and a set of image use information including a plurality of network or website image use authorization records, different authorized uses for images of the first user being specified in at least some of the image use authorization records, said image use authorization records including at least a first image use authorization record, a second image use authorization record and a third image use authorization record, the first image use authorization record authorizing use of images of the first user for non-profit purposes, the second image use authorization record indicating use of images of the first user are authorized for dating purposes and the third image use authorization record indicating use of images of the first user are authorized for use with regard to employment or job hunting related uses;

receiving, at the privacy server, a query, said query corresponding to a network or website and including information indicating the network or website to which the query corresponds along with captured biometric information which can be used to identify one or more individuals;

identifying an individual based on the received biometric information; and determining, when the identified individual is the first user to which the first user record corresponds, from stored information included in the first user record whether the identified individual has authorized use of information corresponding to the identified individual or an image of the identified individual by the network or website to which the received query corresponds; and responding to said query with information indicating whether use of the received biometric information is authorized or not permitted.

2. The method of claim 1, wherein said biometric information includes an image of the identified individual.

3. The method of claim 1, wherein said biometric information includes weight or a fingerprint scan of the first user.

4. The method of claim 1, wherein said information corresponding to the identified individual includes at least one of user preference information, user purchase history, web browsing information.

5. The method of claim 1, wherein the stored information includes authorized uses of information corresponding to the identified individual, authorized uses of images of the identified individual, authorized services or authorized web sites for which the individual has indicated his/her image may be used.

6. The method of claim 1, further comprising:
responding to the query with a message indicating that use of images of the identified individual is not authorized.

7. The method of claim 6, wherein said captured biometric information is an image and the response to the query includes a modified version of said image.

8. The method of claim 7, wherein said modified version of the image includes an alteration to a portion of the image which corresponds to the identified individual.

9. The method of claim 8, wherein the alteration of the portion of the image includes blurring or blocking out of some of the portion of the image which corresponds to the identified individual.

10. The method of claim 8, wherein the alteration of the portion of the image includes modifying or replacing at least a portion of the face of the identified individual in the image to render the individual unrecognizable in the modified version of said image.

11. The method of claim 8, further comprising:
providing the identified individual with a report regarding received queries including images in which the identified individual was identified.

12. A privacy control server, comprising:
a storage device storing a first user record of a customer record database, a first user name, a user provided sample image and a set of image use information including a plurality of network or website image use authorization records, different authorized uses for images of the first user being specified in at least some of the image use authorization records, said image use authorization records including at least a first image use authorization record, a second image use authorization record and a third image use authorization record, the first image use authorization record authorizing use of images of the first user for non-profit purposes, the second image use authorization record indicating use of images of the first user are authorized for dating purposes and the third image use authorization record indicating use of images of the first user are authorized for use with regard to employment or job hunting related uses;
a receiver configured to receive a query including captured biometric information which can be used to identify one or more individuals;
an identification module configured to identify an individual based on the received biometric information; and
a determination module configured to determine, based on stored information, whether the identified individual has authorized use of information corresponding to the identified individual or an image of the identified individual.

13. The privacy control server of claim 12, further comprising:
memory including the stored information, said stored information identifying authorized uses of information corresponding to the identified individual, authorized uses of images of the identified individual, authorized services or authorized websites for which the individual has indicated his/her image may be used.

14. The privacy control server of claim 12, further comprising:
a response generation module configured to generate a response message, in response to said query, indicating that use of images of the identified individual is not authorized, said response message indicating that use of images of the identified individual is not authorized being generated when said determination module determines that the identified individual has not authorized use of his or her image; and
a communications control module configured to control a transmitter to transmit said response message to a device in response to said query.

15. The privacy control server of claim 14, wherein said captured biometric information is an image and wherein the response generation module includes an image modification module configured to generate a modified version of said image, said response message including said modified version of said image.

16. The privacy control server of claim 15, wherein said modified version of the image includes an alteration to a portion of the image which corresponds to the identified individual.

17. The privacy control server of claim 16, wherein the alteration of the portion of the image is performed by said image modification module by blurring or blocking out of some of the portion of the image which corresponds to the identified individual.

18. The privacy control server of claim 16, wherein the alteration of the portion of the image is performed by said image modification module by modifying or replacing at least a portion of the face of the identified individual in the image to render the individual unrecognizable in the modified version of said image.

19. The privacy control server of claim 16, further comprising:
a report generation module configured to generate a report regarding received queries including images in which the identified individual was identified; and
wherein said communications control module is configured to control said transmitter to send said report to the identified individual.

20. A non-transitory computer readable medium for use in a privacy control server, said non-transitory computer readable medium comprising computer executable instructions which when executed by at least one computer control said privacy control server to:
store in a storage device storing a first user record of a customer record database, a first user name, a user provided sample image and a set of image use information including a plurality of network or website image use authorization records, different authorized uses for images of the first user being specified in at least some of the image use authorization records, said image use authorization records including at least a first image use authorization record, a second image use authorization record and a third image use authorization record, the first image use authorization record authorizing use of images of the first user for non-profit purposes, the second image use authorization record indicating use of images of the first user are authorized for dating purposes and the third image use authorization record indicating use of images of the first user are authorized for use with regard to employment or job hunting related uses;

receive a query including captured biometric information which can be used to identify one or more individuals;

identify an individual based on the received biometric information; and determine, from stored information, whether the identified individual has authorized use of information corresponding to the identified individual or an image of the identified individual.

* * * * *